US008406548B2

(12) United States Patent
Ali et al.

(10) Patent No.: US 8,406,548 B2
(45) Date of Patent: Mar. 26, 2013

(54) METHOD AND APPARATUS FOR PERFORMING A BLUR RENDERING PROCESS ON AN IMAGE

(75) Inventors: Gazi Ali, Santa Clara, CA (US); Kenichi Nishio, Yokohaya (JP); Florian Ciurea, San Jose, CA (US); Hideki Nabesako, Tokyo (JP)

(73) Assignee: Sony Corporation, Minato-Ku, Tokyo (JP)

( * ) Notice: Subject to any disclaimer, the term of this patent is extended or adjusted under 35 U.S.C. 154(b) by 137 days.

(21) Appl. No.: 13/036,656

(22) Filed: Feb. 28, 2011

(65) Prior Publication Data

US 2012/0219236 A1    Aug. 30, 2012

(51) Int. Cl.
  *G06K 9/00*    (2006.01)
(52) U.S. Cl. .......................................... 382/254; 382/260
(58) Field of Classification Search .................. 382/154, 382/168–172, 240–243, 260, 264, 298–300; 345/419, 426–427, 420; 348/362, 371, 364, 348/207.99, 366, 365, 348
See application file for complete search history.

(56) References Cited

U.S. PATENT DOCUMENTS

| 6,654,020 | B2 |  | 11/2003 | Mori |  |
|---|---|---|---|---|---|
| 7,187,413 | B2 | * | 3/2007 | Alderson | 348/353 |
| 7,586,489 | B2 | * | 9/2009 | Muller-Fischer et al. | 345/427 |
| 8,126,279 | B2 | * | 2/2012 | Marcellin et al. | 382/232 |
| 2004/0239673 | A1 | * | 12/2004 | Schmidt | 345/426 |
| 2005/0232507 | A1 |  | 10/2005 | Zimmer |  |
| 2007/0036427 | A1 | * | 2/2007 | Nakamura et al. | 382/154 |
| 2007/0189750 | A1 |  | 8/2007 | Wong et al. |  |
| 2008/0089598 | A1 | * | 4/2008 | George et al. | 382/255 |
| 2011/0032341 | A1 | * | 2/2011 | Ignatov et al. | 348/51 |
| 2011/0069152 | A1 | * | 3/2011 | Wang et al. | 348/43 |
| 2012/0056984 | A1 | * | 3/2012 | Zhang et al. | 348/43 |
| 2012/0194642 | A1 | * | 8/2012 | Lie et al. | 348/43 |

FOREIGN PATENT DOCUMENTS

| EP | 1 494 174 A1 | 1/2005 |
|---|---|---|
| WO | WO 2009/077617 A1 | 6/2009 |
| WO | WO 2010/036098 A1 | 4/2010 |

OTHER PUBLICATIONS

Tam, W.J.; Liang Zhang; , "3D-TV Content Generation: 2D-to-3D Conversion," Multimedia and Expo, 2006 IEEE International Conference on , vol., No., pp. 1869-1872, Jul. 9-12, 2006.*

(Continued)

*Primary Examiner* — Andrae S Allison
(74) *Attorney, Agent, or Firm* — Moser Taboada (57) ABSTRACT

A method and apparatus for performing a blur rendering process on an image is disclosed. In one embodiment, the method of performing a blur rendering process includes accessing a filtered image and depth map information, determining a plurality of blending coefficients for computing a weighted sum for the image and filtered image, wherein the plurality of blending coefficients define a substantially smooth transition from at least one first depth class to at least one second depth class and a substantially sharp transition from the at least one second depth class and the at least one first depth class, wherein the at least one first depth class and the at least one second depth class form at least a portion of a plurality of depth classes and combining the image and the filtered image into a resulting image using the plurality of coefficients.

20 Claims, 8 Drawing Sheets

OTHER PUBLICATIONS

P. Harman, J. Flack, S. Fox, and M. Dowley, "Rapid 2D to 3D conversion," Proc. SPIE, vol. 4660, pp. 78-86, 2002.*

Varekamp, C.; Barenbrug, B.; , "Improved depth propagation for 2D to 3D video conversion using key-frames," Visual Media Production, 2007. IETCVMP. 4th European Conference on , vol., No., pp. 1-7, Nov. 27-28, 2007.*

Powerpoint Presentation entitled "Active Refocusing of Images and Videos" Francesc Moreno-Noguer et al., pp. 1-74, no date.

"Active Refocusing of Images and Videos" Francesc Moreno-Noguer et al., pp. 1-9, no date.

"An Iterative Optimiation Approach for Unified Image Segmentation and Matting", Jue Wang et al., pp. 1-8, no date.

"Real-Time Depth of Field Simulation", Guennadi Riguer, Natalya Tataruck, and John Isidoro, from ShaderX$^2$—Shader Programming ips and Tricks with Direct X9, pp. 1-30, no date.

"Advanced Depth of Field", Thorsten Scheuermann, 3D Application Research Group, ATI Research, Inc., 22 pages, no date.

* cited by examiner

METHOD AND APPARATUS FOR PERFORMING A BLUR RENDERING PROCESS ON AN IMAGE

BACKGROUND

1. Technical Field

Embodiments of the present invention generally relate to image processing techniques and, more particularly, to a method and apparatus for performing a blur rendering process on an image.

2. Description of the Related Art

At times, it is desirable to create visual effects (i.e., blur rendering) for various applications related to computer graphics, photography, or video and/or the like. Image processing systems use rendering to make certain regions of an image appear out of focus. For example, given a still image generated by an imaging device and a corresponding depth map that associates a depth value to each pixel in the original image, blur rendering can achieve an increase in the blur in out-of-focus areas, thus transforming the original image into a simulated image as it would be taken by an imaging device with a lower depth of field. Blur rendering may also be used to remove noise from non-linear color maps and depth maps. Generally, the image is blurred by changing intensity values for X pixels vertically and Y pixels horizontally. By computing weighted averages for each pixel, pixel gradients (changes in color) are mostly retained, however a lot of the fine detail within the image is removed.

Conventionally, various techniques utilize low pass filters (i.e., Gaussian filters) to compute the weighted intensity values (i.e. smooth the image). The Gaussian filters are well known n×n filters (e.g., a 3×3 matrix) that attenuate amplitudes of a signal when a frequency exceeds a cut-off frequency and are used to simulate a lens blur. However, Gaussian filters are known to be non-edge preserving and give rise to imaging artifacts. Using edge-preserving filters instead of Gaussian filters can reduce artifacts, but such implementations are generally slow or make use of large memory. In computer graphics, alpha matting or mipmap techniques are used. Such techniques have proven to be cumbersome and impractical, especially in large images (i.e., greater than four Kilobytes). Such techniques primarily involve manual operations and are not automated. The conventional techniques are inefficient, computationally expensive and unable to provide an automated solution for blur rendering.

Therefore, there is a need in the art for a method and apparatus for performing an improved blur rendering process on an image in a manner that preserves accurate optical properties related to the blur rendering process.

SUMMARY

Various embodiments of the present disclosure generally include a method and apparatus for performing a blur rendering process on an image. In one embodiment, a method of performing a blur rendering process on an image is disclosed. The method comprises accessing a filtered image and depth map information, determining a plurality of blending coefficients for computing a weighted sum on the image and filtered image, wherein the plurality of blending coefficients define a non-linear transformation comprising a substantially smooth transition from at least one first depth class to at least one second depth class and a substantially sharp transition from the at least one second depth class and the at least one first depth class and combining the image and the filtered image into a resulting image using the plurality of coefficients. In some embodiments, the non-linear transformation comprises a substantially smooth transition between a foreground and a background and a substantially sharp transition between the background and the foreground.

An apparatus for performing a blur rendering process on an image, wherein an image processor for accessing a filtered image and depth map information, determines a plurality of blending coefficients for computing a weighted sum on the image and filtered image. The plurality of blending coefficients define a non-linear transformation which comprises a substantially smooth transition from at least one first depth class to at least one second depth class, and a substantially sharp transition from the at least one second depth class and the at least one first depth class, and combining the image and the filtered image into a resulting image using the plurality of blending coefficients.

A computer readable storage medium comprising one or more processor executable instructions that, when executed by at least one processor, causes the at least one processor to perform a method. This method comprises accessing a filtered image, and depth map information which determines a plurality of blending coefficients for computing a weighted sum on the image and filtered image. The plurality of blending coefficients define a non-linear transformation which comprises a substantially smooth transition from at least one first depth class to at least one second depth class, and a substantially sharp transition from the at least one second depth class and the at least first depth class and combining the image and the filtered image into a resulting image using the plurality of blending coefficients.

BRIEF DESCRIPTION OF THE DRAWINGS

FIG. 8 illustrates a functional block diagram of a process for performing a blur rendering process on an image, according to one or more embodiments; and While the system and method for performing a blur rendering process on an image is described herein by way of example for several embodiments and illustrative drawings, those skilled in the art will recognize that the system and method for performing a blur rendering process on an image is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for performing a blur rendering process on an image as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing a blur rendering process on an image are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
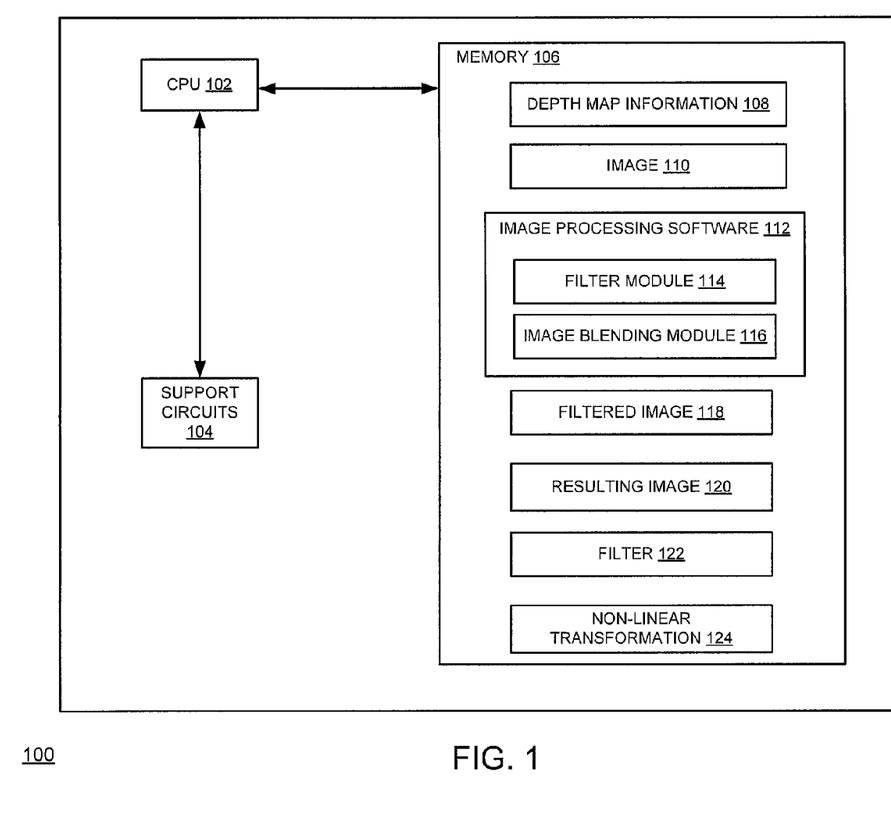
FIG. 1 illustrates a block diagram of a device for performing a blur rendering process on an image, according to one or more embodiments.

FIG. 1 is a block diagram of a device 100 for performing a blur rendering process on an image 110, according to one or more embodiments. The device 100 is a type of computing device (e.g., a laptop, a desktop, a Personal Digital Assistant (PDA), a digital camera, a video camera, a web camera and/or the like) known to one of ordinary skill in the art having the benefit of this disclosure. The device 100 comprises a CPU 102, support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a Read Only Memory, Random Access Memory, disk drive storage, optical storage, removable storage, and the like. The memory 106 includes various software packages and data, such as depth map information 108, an image 110, image processing software 112, a filtered image 118, a resulting image 120, a filter 122 and a non-linear transformation 124.

The image 110 can be obtained from an image source (not shown) and is stored in the memory 106. According to some embodiments, the depth map information 108 includes a representation of the image 110 where a depth value is used to indicate a distance of a point (i.e., a pixel location) in the image 110 from a focal plane. The focal plane can be any point in or out of the image 110, but is typically located at a main object of the image 110. Other points in the image 110 are either more distant or less distant from the local plane. All pixels representing an object behind the focal plane (i.e., the background) are allocated a depth value representing a distance from a camera. All pixels representing an object in front of the focal plane (i.e., the foreground) are allocated a depth value representing a distance from the camera to the focal plane.

In some embodiments, the depth map information 108 includes a dense depth map that is utilized by the image processing software 112 to perform the blur rendering process. However, currently available techniques for depth map generation can only produce a coarse depth map having a reduced spatial resolution. In order to create the dense depth map, a refinement process is executed, such as those described with respect to U.S. non-provisional patent application Ser. No. 12/931,293, entitled "Method and apparatus for generating a dense depth map using an adaptive joint bilateral filter" and filed on Jan. 28, 2011, which is herein incorporated by reference in its entirety.

According to some embodiments, the image processing software 112 includes software code (e.g., processor executable instructions) for performing the blur rendering process on the image 110. The image processing software 112 includes a filter module 114 and an image blending module 116. Based on the depth map information 108, the filter module 114 determines one or more filtering parameters, such as a blur radius, for blurring two or more regions (i.e., depth classes) within the image 110, such as background regions and/or foreground regions, according to one or more embodiments.

The filter module 114 uses these parameters to create the filter 122, such as an edge-preserving low-pass filter that uses depth values to blur pixel information while preserving pixel information at boundaries of the certain regions. In some embodiments, the filter 122 includes an N×N kernel (i.e., matrix) having a size that is compatible with the optimal blur radius.

According to some embodiments, the image blending module 116 rescales the depth map information 108 by assigning blending coefficients (i.e., weights) to each pixel in the image 110. For a certain pixel, a corresponding blending coefficient may represent a probability of being in the background regions. These blending coefficients form the non-linear transformation 124 that expresses transitions (e.g., smooth or sharp transitions) between the foreground regions and the background regions. The image blending module 116 converts these blending coefficients into weights, which are applied to the image 110 and the filtered image 118 to create the resulting image 120.

Figure 2:
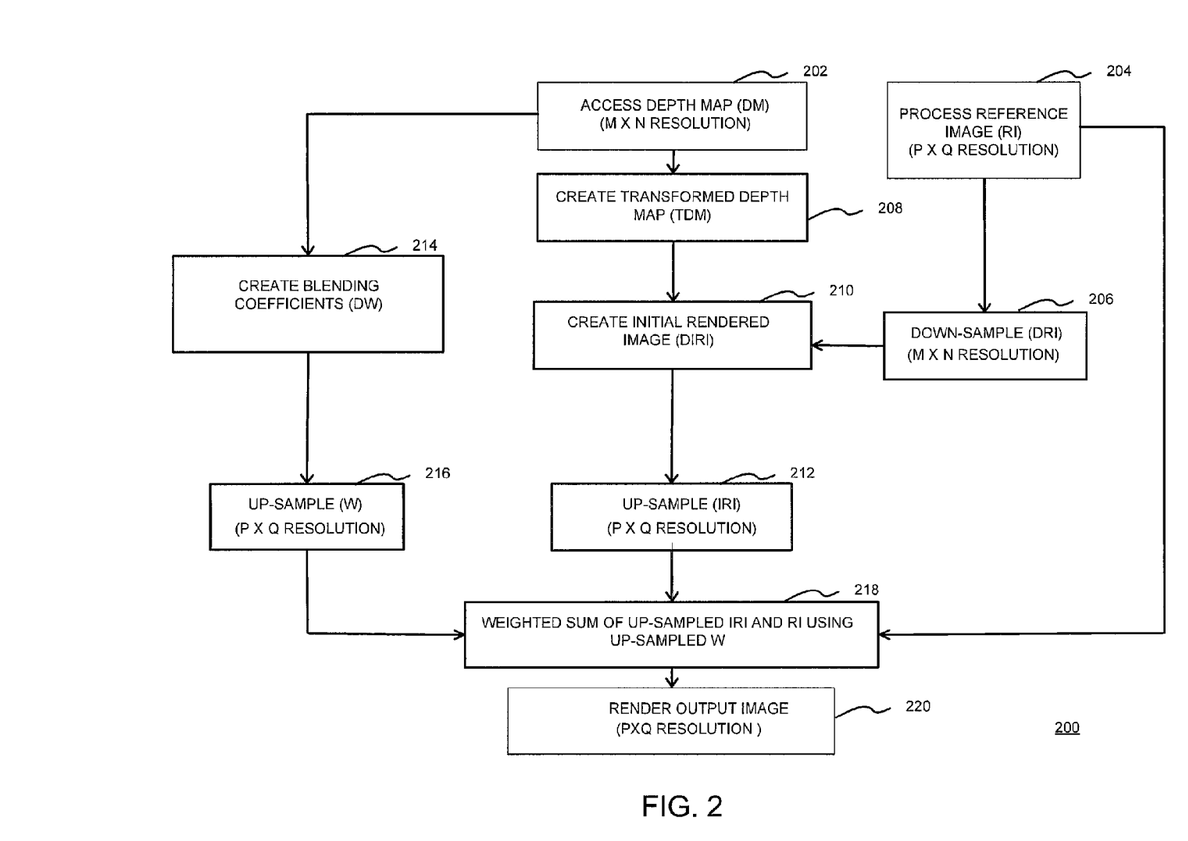
FIG. 2 illustrates a functional block diagram of a process for performing a blur rendering process on an image using two-depth classes, according to one or more embodiments.

FIG. 2 is a flow diagram illustrating a blur rendering process 200 on an image and a depth map, according to one or more embodiments. In some embodiments, the blur rendering process 200 is a two depth class rendering operation. It is appreciated that the blur rendering process can be extended for multiple depth class blending in order to generate a rendered output image. Each and every step of the process 200 is performed by image processing software (e.g., the image processing software 112 of FIG. 1). At step 202, the process 200 accesses the depth map for the image from depth map information. At step 204, the process 200 accesses the image for use as a reference image (RI) for rendering a blurred image. At step 206, the process 200 down-samples the reference image (DRI), which is later filtered using a non-linear or linear transformation based on the depth map.

At stop 208, the process 200 creates a transformed depth map (TDM) by rescaling depth values and then, determining an optimal blur radius for each rescaled depth value. In some embodiments, the image processing software uses a filter module (e.g., the filter module 114 of FIG. 1) to transform the depth map information onto a specific range of scaled depth values (e.g., between zero and one [0,1]). In some embodiments, the filter module performs a non-linear transformation of the depth values to optimal blur radii. The filter module determines parameters for defining the filter. In some embodiments, a depth map rescaling function exploits a relationship between the depth values and the blur radius, such as the power law relationship (e.g., optimal blur radius is proportional to a number of iterations raised to a certain power) as known to one skilled in the relevant art. A detailed description for the depth map rescaling function is disclosed in U.S. non-provisional patent application Ser. No. 12/728,309, filed Mar. 22, 2010 and entitled "Blur Function Modeling for Depth of Field Rendering", is herein incorporated by reference.

At step 210, the process 200 filters the down-sampled reference image (DRI) and renders a filtered image, such as an down-sampled initial rendered image (DIRI), using the transformed depth map from step 208. During step 210, in some embodiments, the filter module applies a selective low-pass filter to the image to blur various regions, such as background regions and/or foreground regions, while preserving pixel information at edges or boundaries. As an example, pixels within a certain range of depth values for low-pass filtering while excluding the other pixels that are not within the range.

At step 212, the filtered image (DIRI) is up-sampled to create the up-sampled initial rendered image (IRI). At step 214, the process 200 creates down-sampled blending coefficients (DW) from the depth map information. In some embodiments, the image processing software uses an image blending module (i.e., the image blending module 116 of FIG. 1) to determine blending coefficients for a non-linear transformation (e.g., the non-linear transformation 124 of FIG. 1), which are used to combine one or more regions of the input image with one or more regions of the filtered image. The image blending module determines a probability (i.e., a posterior probability) of having a particular depth value when a certain pixel is known to be in the background. The probability is stored as a blending coefficient and used as a weight for blending the focused/unfiltered foreground of the input image with the blurred background of the filtered image to match an opacity of the certain pixel.

At step 216, the process 200 up-samples the down-sampled blending coefficients (W). As explained further below in the description of FIG. 5, a blending coefficient (W) represents a probability or weight that a given background pixel has a particular depth value. At step 218, using the up-sampled blending coefficients (W), the process 200 computes a weighted sum of the up-sampled filtered image, such as the initial rendered image (IRI), and the reference image (RI). At step 220, the process 200 renders an output image (RO) using the weighted sum of the reference image (RI) and the initial rendered image (IRI). In some embodiments comprising two depth class, the following equation is used to compute the weighted sum at each pixel level:

Rendered Output Image (RO)=(1−$W$)×RI+$W$×IRI

Figure 3:
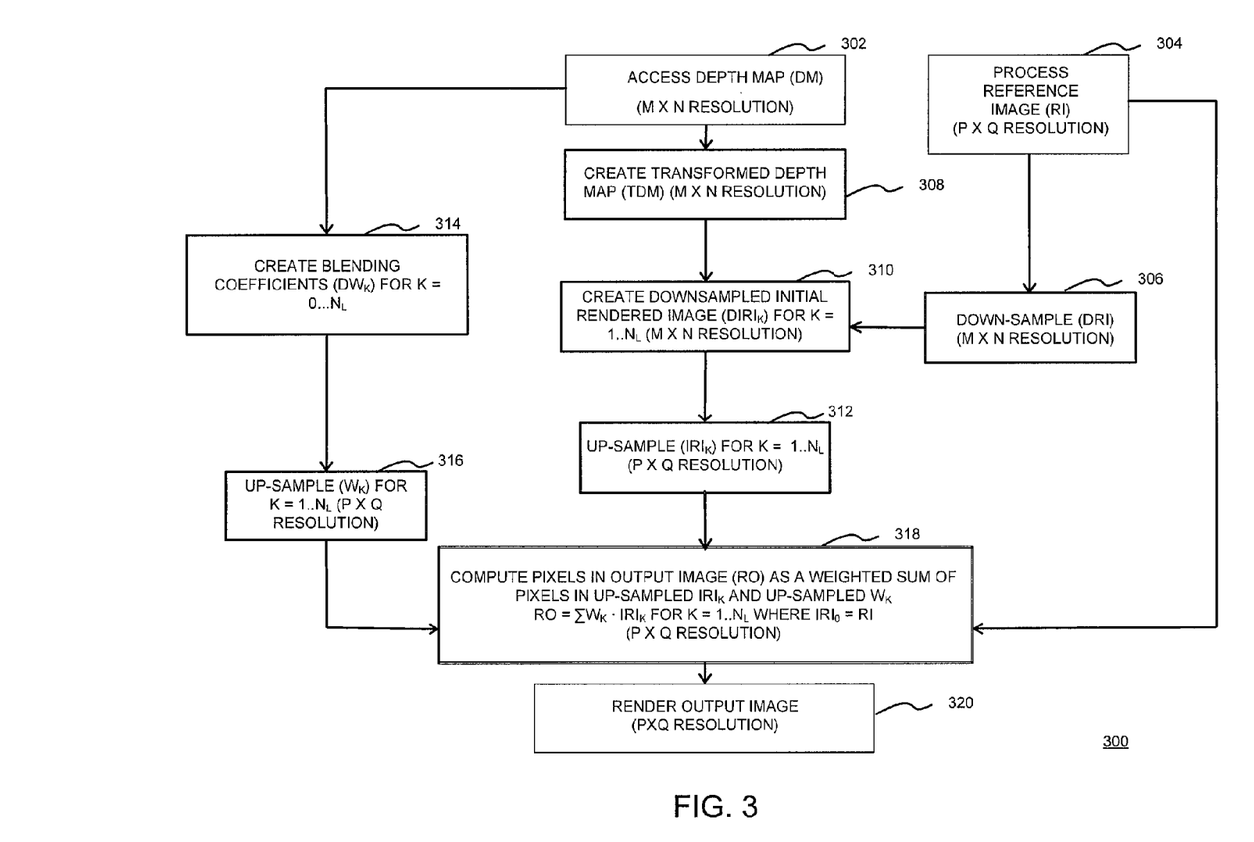
FIG. 3 illustrates a functional block diagram of a process for performing a blur rendering process on an image using multiple depth classes, according to one or more embodiments.

FIG. 3 is a flow diagram illustrating a blur rendering process 300 on an image and a depth map, according to one or more embodiments. Specifically, FIG. 3 illustrates the blur rendering process 300 for multiple depth classes. At step 302, the process 300 accesses the depth map for the image from depth map information. At step 304, the process 300 accesses the image for use as a reference image (RI) for rendering a blurred image. At step 306, the process 300 down-samples the reference image (DRI), which is later filtered using a non-linear or linear transformation based on the depth map.

At stop 308, the process 300 creates a transformed depth map by rescaling depth values and then, determining an optimal blur radius for each rescaled depth value. In some embodiments, the image processing software uses a filter module (e.g., the filter module 114 of FIG. 1) to transform the depth map information onto a specific range of scaled depth values (e.g., between zero and one [0,1]). In some embodiments, the filter module performs a non-linear transformation of the depth values to optimal blur radii. The filter module determines parameters for defining the filter. In some embodiments, a depth map rescaling function exploits a relationship between the depth values and the blur radius, such as the power law relationship (e.g., optimal blur radius is proportional to a number of iterations raised to a certain power) as known to one skilled in the relevant art.

At step 310, the process 300 filters the down-sampled reference image (DRI) and renders a filtered image, such as a down-sampled initial rendered image ($DIRI_k$), using the transformed depth map from step 308. In some embodiments, the process 300 creates the down-sampled initial rendered image ($DIRI_k$) at layer of depth k for all k from 1 to $n_L$ (i.e., total number of layers or depth classes). Hence, the $DIRI_k$ includes pixel information for all pixels having depth values within a depth class defined by the layer of depth k. These pixels form a region (i.e., a depth class region, such as a background or foreground) that is combined with regions from another image, such as the reference image (RI). During step 310, in some embodiments, the filter module applies a selective low-pass filter to the image to blur various regions, such as background regions and/or foreground regions, while preserving pixel information at edges or boundaries. As an example, pixels within a certain range of depth values for low-pass filtering while excluding the other pixels that are not within the range.

At step 312, the filtered image ($DIRI_k$) is up-sampled to create the up-sampled initial rendered image ($IRI_k$). At step 314, the process 300 creates down-sampled blending coefficients ($DW_k$) from the depth map information. In some embodiments, the image processing software uses an image blending module (i.e., the image blending module 116 of FIG. 1) to determine blending coefficients for a non-linear transformation (e.g., the non-linear transformation 124 of FIG. 1), which are used to combine one or more regions of the input image with one or more regions of the filtered image. The image blending module determines a probability (i.e., a posterior probability) of having a particular depth value when a certain pixel is known to be in the background. The probability is stored as a blending coefficient and used as a weight for blending the focused/unfiltered foreground of the input image with the blurred background of the filtered image to match an opacity of the certain pixel.

At step 316, the process 300 up-samples the blending coefficients ($W_k$). As explained further below in the description of FIG. 5, a blending coefficient represents a probability or weight ($W_k$) that a given background pixel has a particular depth value. In some embodiments, the process 300 up-samples the blending coefficients ($W_k$) for all depth classes k from one (1) to $n_L$. At step 318, using the up-sampled blending coefficients, the process 300 computes a weighted sum of the up-sampled filtered image (IRI) and the reference image (RI). At step 320, the process 300 renders an output image (RO) using the weighted sum of the reference image (RI) and the initial rendered image (IRI). In some embodiments comprising two depth class, the following equation is used to compute the weighted sum at each pixel level:

According to embodiments involving multiple depth classes, the process computes the rendered output pixel for the output image (RO) as the weighted sum of all pixels in the up-sampled $IRI_k$ using the up-sampled $W_k$, where k corresponds to depth class k.

$$RO = \sum_{k=0}^{n_L} W_k * IRI_k$$

For the foreground depth class (i.e., depth class k=0), which corresponds to the foreground regions, the initial rendered image (IRI) is the original image RI:

$$IRI_0 = RI$$

Figure 4:
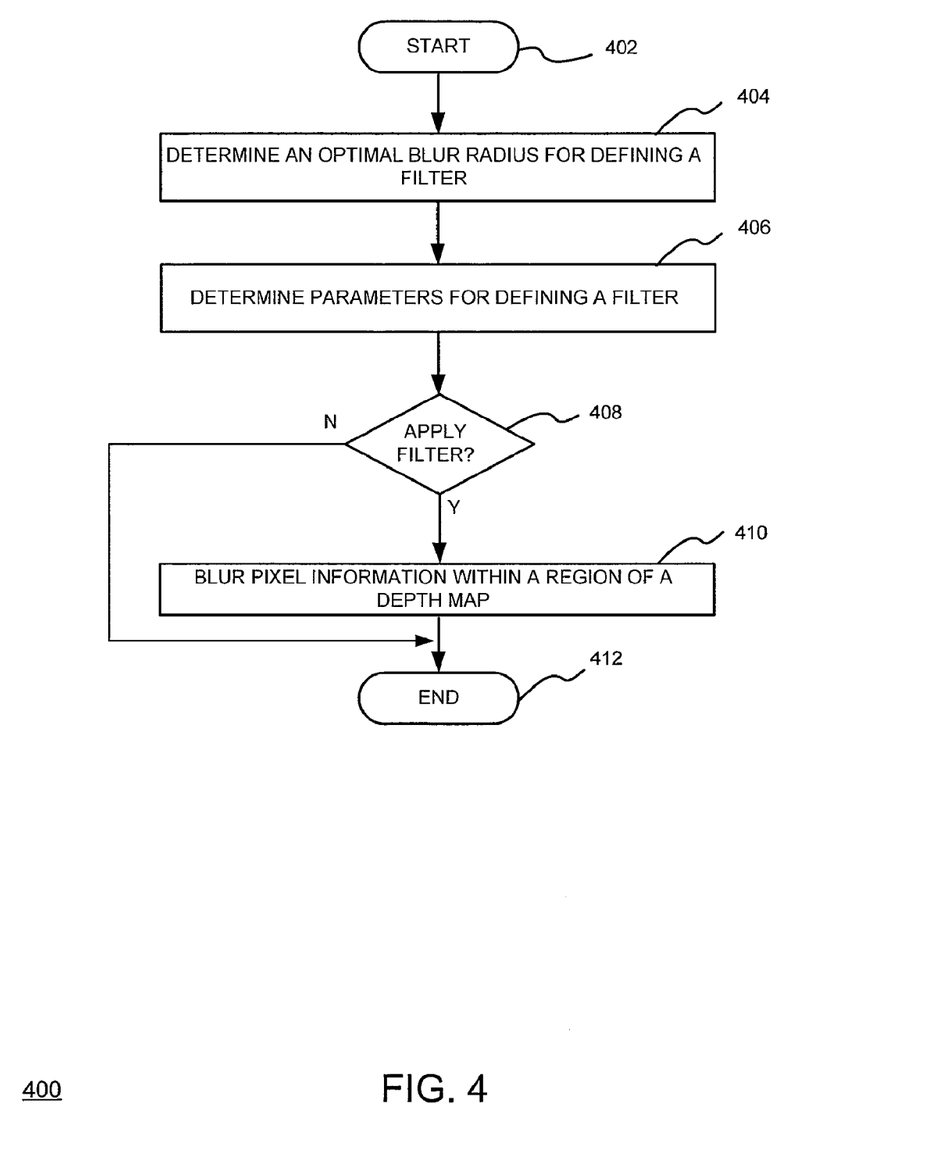
FIG. 4 illustrates a flow diagram of a method for determining a blur radius and creation of initial rendered image, according to one or more embodiments.

FIG. 4 illustrates a flow diagram of a method 400 for determining a blur radius, according to one or more embodiments. The method 400 starts at step 402 and proceeds to step 404, at which the method 400 accesses a depth map and extracts values that are functionally related to the depth map. These values are used to determine an optimal blur radius for defining a filter as explained further below. In some embodiments, a filter module uses a kernel (i.e., an image processing matrix) having a size matching a particular blur radius to blur a region of an image. The filter module applies the kernel onto the region to modify pixel information as explained in detail further below.

At step 406, the method 400 determines parameters for defining the filter, such as the optimal blur radius. In some embodiments, the optimal blur size is determined using a transformation (e.g., non-linear or linear) that maps each depth value (i.e., iteration number) to a specific and/or unique blur radius. In other words, the transformation produces a variable kernel size for filtering different regions (i.e., pixels) of the image. The depth values of the transformation may be rescaled to specific range (e.g., between zero and one [0, 1]). In some embodiments, the kernel size and hence, the blur radius for a given pixel may be approximately equal to a corresponding non-linear relationship between the depth value and a blur-radius (i.e., a function of depth values, such as depth value to a certain power (e.g., the iteration number squared)). Such iteration numbers, as used in the present disclosure, are described in detail in U.S. non-provisional patent application Ser. No. 12/728,309, filed Mar. 22, 2010 and entitled "Blur Function Modeling for Depth of Field Rendering", which is herein incorporated by reference. The method 400 may modify the particular blur radius based on apparent blur strength of the blurred region to correct blurring errors when rendering a filtered image as explained further below.

The optimal blur radius may be used to define an edge-preserving low-pass filter. At step 408, the method 400 determines whether to apply the filter to the image. In some embodiments, a 'dead band' is defined as a region where the application of the filter is prohibited. The 'dead band' ensures that the foreground region can avoid unnecessary blur filter operations. If it is determined that the filter is not being applied to the image (option "NO"), the method 400 proceeds to step 412, at which, the method 400 ends. If it is determined that if the image is to be filtered (option "YES"), the method 400 proceeds to step 410. At step 410, the method 400 blurs pixel information for pixels within a region while preserving pixel information for pixels between regions. During this step, the method 400 blurs the pixel information for pixels that are within certain range of depth values and excludes pixel information from other depth value regions. The pixel information between the regions may be located at boundaries or edges between a foreground region and a background region. A selective low-pass filtering ensures that there is no blending of background object into foreground. As an example, we included pixels within certain range of depth values for low-pass filtering while excluding the other pixels that are not within the range. The method 400 proceeds to step 412 at which the method 400 ends.

Figure 5:
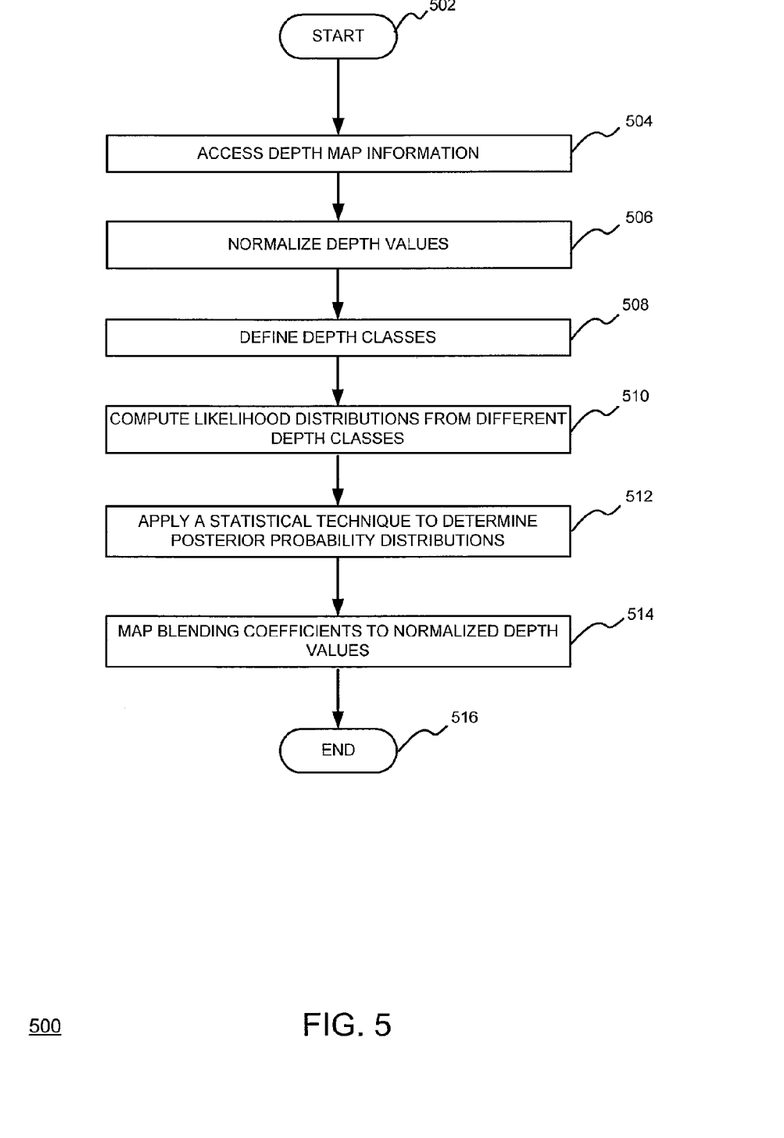
FIG. 5 illustrates a flow diagram of a method for determining blending coefficients for computing a weighted sum, according to one or more embodiments.

FIG. 5 illustrates a flow diagram of a method 500 for determining blending coefficients, according to one or more embodiments. The method 500 starts at step 502 and proceeds to step 504, at which the method 500 accesses the depth map information. At step 506, the method 500 normalizes (i.e., rescales) depth values of the depth map information. In some embodiments, the depth values are transformed onto a range between zero and one of which a near depth plane and a far depth plane respectfully represent.

At step 508, the method 500 defines depth classes in terms of the depth values associated with the image. Each depth class includes a region defined by a specific range of depth values. In some embodiments, the method 500 classifies a pixel as foreground, background or unknown according to a corresponding depth value. In other embodiments, the method 500 may classify the pixel as another depth class amongst multiple depth classes. For the pixels classified as unknown, corresponding depth values are located in the overlapping regions of the foreground and the background. At step 510, the method 500 computes likelihood distributions for the background and the foreground. The corresponding depth values can be modeled to fit the Gaussian distribution. The fitting can be performed using standard statistical methods (e.g. EM (expectation maximization) algorithm). An exemplary two depth class approach is described with respect to FIG. 6. Overlap between likelihood distributions of the background and the foreground decreases a slope of the posterior distribution. That means if the background and foreground classes are well separated, we would have a very steep posterior distribution. In embodiments that include multiple depth classes, each probability of the Gaussian distribution may constitute a blending coefficient or weight for blurring the image.

At step 512, the method 500 applies a known statistical technique, such as maximum a posteriori probability (MAP) technique, to the likelihood distributions that are generated during step 510 to generate posterior probability functions. In other implementations, a maximum likelihood (ML) estimate can also be used. In addition, in order to have a close form solution, curve fitting techniques can be applied on the posterior distribution.

At step 512, the method 500 fits the posterior probabilities to a Gaussian distribution. The method 500 fits the Gaussian distribution to the posterior probability distributions of individual depth classes and produces a joint probability distribution. The corresponding depth values are modeled to fit the Gaussian distribution. In some embodiments, the method 500 modifies the Gaussian distribution in response to the posterior probability distributions. For example, overlap between likelihood distributions of the background and the foreground decreases a slope of the Gaussian distribution. Each probability of the Gaussian distribution may constitute a blending coefficient or weight for blurring the image. The blending coefficients are functionally related to the posterior probability estimated in 512. These blending coefficient values are stored to create the final rendered image. At step 514, the method 500 maps the blending coefficients to the depth values. For each pixel location in the depth map information, the method 500 stores the mapped blending coefficient at an equivalent pixel location in a non-linear transformation 124. At step 516, the method 500 ends.

Figure 6:
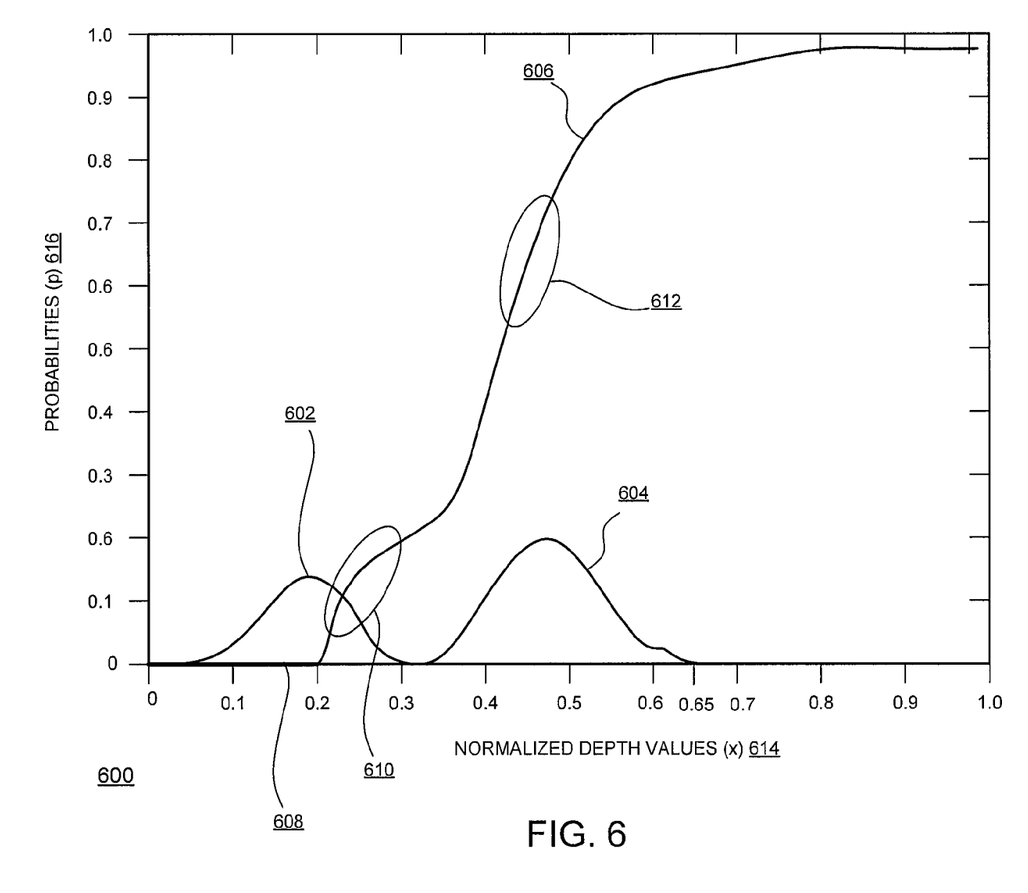
FIG. 6 illustrates a graph depicting an exemplary non-linear transformation for determining blending coefficients for two-depth class implementation, according to one or more embodiments.

FIG. 6 illustrates a graph 600 depicting a non-linear transformation for performing a blur rendering process on an image, according to one or more embodiments. FIG. 6 specifically illustrates an example of a two depth class approach for designing a method for classifying pixels into one of two specific regions, such as a foreground and a background, of an image according to depth. It is appreciated that known segmentation techniques are applied to the image to define the foreground, the background as well as transition (i.e., unknown) regions. It is also appreciated that a multiple depth class approach is also feasible in other embodiments of the present disclosure.

The graph 600 includes normalized depth values (x) across an X-axis 614 and probabilities or likelihoods (i.e., blending coefficients) across a Y-axis 616. A likelihood distribution 602 ($p(x|\omega_0)$) indicates a probability that a pixel at a certain depth value is located within the foreground. A likelihood distribution 604 ($p(x|\omega_1)$) indicates a conditional probability that a pixel is in the background class (i.e., region) given the depth value. The likelihood function 602 for the foreground class and the likelihood function 604 for the background class constitute priors during the application of a known statistical technique. After applying the known statistical technique on the depth values, parameters for the likelihood function 602 and the likelihood function 604 are determined. Once the a-priori distributions are properly modeled, a location of a normalized depth value could indicate a possibility of belonging to a certain depth class.

In some embodiments, after normalizing and fitting the depth values to the likelihood distribution 602 for the foreground and the likelihood distribution 604 for the background, image processing software determines an average depth value at which a given pixel is in the background. As an example, pixels within a depth of 0.3 are most likely in the foreground and pixels that are between a depth of 0.4 and 0.5 are most likely in the background.

Pixels having depth values that are definitely associated with the background are assigned a weight of one (W=1), whereas pixels associated with the foreground are assigned a weight of zero (W=0). As illustrated, it is known that pixels within a depth of 0.2 are definitely in the foreground and pixels that exceed a depth of around 0.7 are definitely in the background. Pixels in the unknown regions are assigned a weight that depends upon a posterior probability distribution 606 ($p(\omega_1|x)$) of the background.

The following illustrates an exemplary embodiment of the posterior probability distribution 606 where x represents a normalized depth value, $\omega_0$ represents the foreground depth class and $\omega_1$ represents the background depth class. Furthermore, $p(x|\omega_0)$ represents a class conditional likelihood of a pixel having a depth value x and belonging to a foreground depth class and $p(x|\omega_1)$ represents a class conditional likelihood of a pixel having a depth value x and belonging to a background depth class.

Using ($\mu_0$, $\sigma_0$) to represent a mean and standard deviation for a foreground depth class and ($\mu_1$, $\sigma^1$) to represent a mean and standard deviation for a foreground depth class, a posterior probability function $p(\omega_1|x)$ may be computed. For example, the posterior probability function $p(\omega_1|x)$ represents a likelihood distribution of belonging to the background depth class for a particular depth value x. In such an exemplary embodiment, $p(\omega_1|x)$ is functionally related to the blending coefficients (e.g., weights (W) as described with respect to FIG. 2). Accordingly, Gaussian distributions for both depth classes may be modeled as follows:

$$p(x|\omega_0)=G(x, \mu_0, \sigma_0)$$

$$p(x|\omega_1)=G(x, \mu_1, \sigma_1)$$

It is appreciated that the equations listed above may be applied to determine blending coefficients for multiple depth classes (i.e., greater than two depth classes) and/or subclasses. Each depth class occupies a layer of a particular depth and variable size. For example, a range of depth values between zero and one may be partitioned into five depth classes of equal size where each depth class refers to an interval of 0.25. Blending coefficients associated with a particular interval (e.g., a layer k between 0.60 and 0.75) are used to combine regions of different images having depth values that fall within the particular interval. As another example, the five depth classes may have different sizes.

The posterior probability distribution 606 indicates a probability that a pixel has a particular depth value when it is known that the pixel is in the background. In some embodiments, the posterior distribution 606 can be computed using the likelihood distribution 602, the likelihood distribution 604 and a maximum a posteriori (MAP) technique that is known to one skilled in the art. In some embodiments, a posterior probability is approximated using maximum likelihood (ML) estimate by using the likelihood distribution 602 and the likelihood distribution 604. It is also possible to fit an empirical curve that would closely follow the posterior distribution.

In some embodiments, the posterior probabilities are used as blending coefficients for estimating opacity (i.e., dullness as a function of depth) and intensity (i.e., color) of pixels in the background of a filtered image (i.e. the filtered image 118 of FIG. 1) during the non-linear transformation. The filtered image passes through an N×N matrix that blurs the background. In some embodiments, the inverse of the weights can be used to identify the foreground in the input image (i.e. the image 110 of FIG. 1). After combining the foreground of the non-blurred, input image and the background of the blurred, filtered image, an image (i.e. the resulting image 120 of FIG. 1) resulting from such a combination includes a blurred background and a focused foreground. For each pixel that is not definitely in the foreground or background, the image blending module 116 stores a sum of a weighted intensity from the input image 110 and a weighted intensity from the filtered image as pixel information for the resulting image. Hence, a color of each such pixel is a blend of colors from the input image and the filtered image.

In some embodiments, the distribution 606 (i.e., the non-linear transformation 124 of FIG. 1) indicates a dead band 608 representing depth values for at least a portion of the foreground. Blending coefficients for the dead band 608 are zero. When used to perform the non-linear transformation, these blending coefficients produce a sharp, focused foreground in a resulting image (the resulting image 120 of FIG. 1). None of the pixel information from pixels that are definitely foreground is lost or discarded during the non-linear transformation.

In some embodiments, the posterior probability distribution 606 indicates a smooth transition 610 from the foreground to the background as well as a sharp transition 612 from the background to the foreground. After fitting the posterior probabilities to the Gaussian distribution, these probabilities are modified such that the smooth transition 610 includes a lower gradient, such that the transition is not abrupt. Because the blending coefficients across such a slope change gradually, pixels having depth values between 0.2 and around 0.3 in an output or resulting image differ slightly from the input image and blend very little with pixels from a low-pass filtered image. As such, the resulting image may have a nominal amount of blur.

In some embodiments, these probabilities are further modified to produce a substantially vertical slope on the curve representing the sharp transition 612. Because the blending coefficients across such a slope change quickly, pixels having depth values between 0.4 and around 0.6 in the resulting image differ greatly from the input image and also differ with other pixels in the resulting image by a non-trivial amount. The sharp transition 612 attenuates pixel information differences (e.g., intensity or color differences) between pixels of different depth values. As such, the sharp transition 612 indicates more contribution from the background class. In some embodiments, estimation of the blending coefficients for embodiments using two depth classes is shown. It is also demonstrated that empirical or mathematical curve fitting method can be applied on the posterior distribution in order to make the rendering more realistic.

Figure 7:
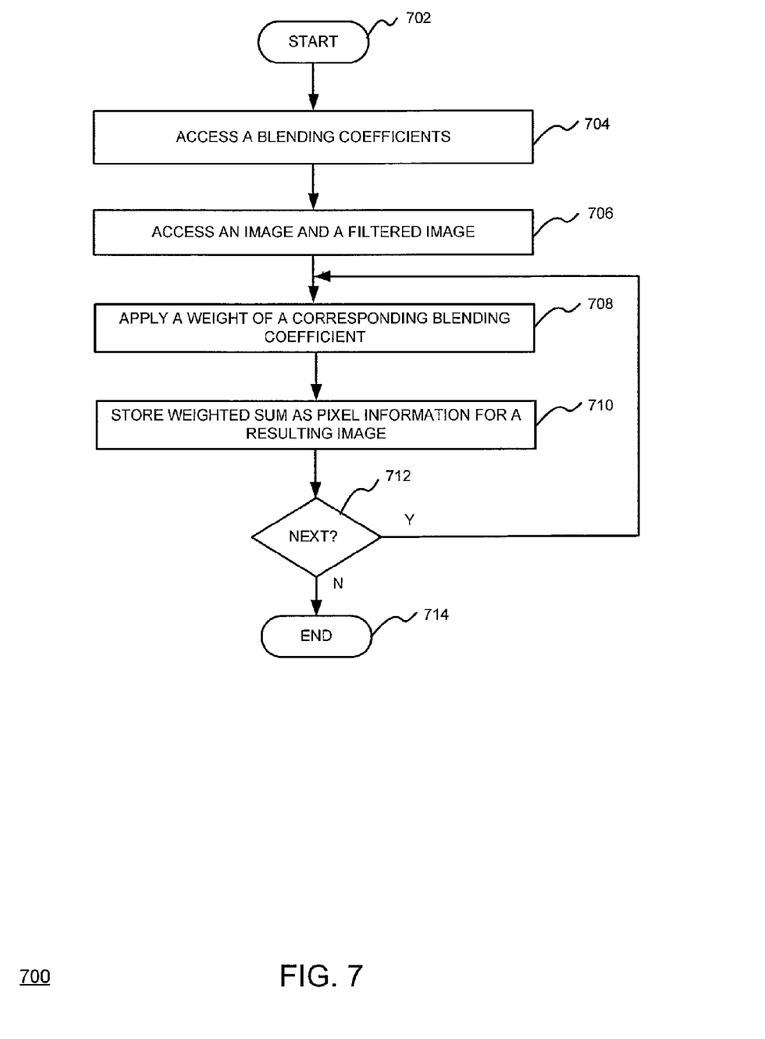
FIG. 7 illustrates a flow diagram of a method for blending a focused background from an image with a background from a filtered image, according to one or more embodiments.

FIG. 7 illustrates a flow diagram of a method 700 for blending the reference image (Reference Image (RI) in FIG. 2) with an initially rendered image (Initial Rendered Image (IRI) in FIG. 2), according to one or more embodiments. The method 700 starts at step 702 and proceeds to step 704, at which the method 700 accesses a plurality of blending coefficients. At step 706, the method 700 accesses an image (Reference Image (RI)) and a filtered transformation (Initial Rendered Image (IRI)) of the image. These blending coefficients may be determined using normalized scaled depth map information.

At step 708, the method 700 applies a weight of a corresponding blending coefficient. In some embodiments, the weight may be an inverse of the corresponding blending coefficient of a particular pixel. The method 700 applies the weight to pixel information for a pixel in the reference image (RI) as well as an initially rendered image (IRI) and computes a weighted sum of the two images.

At step 710, the method 700 stores the weighted sum of the reference image (RI) and initial rendered image (IRI) as pixel information for a resulting image. In some embodiments, the method 700 computes the weighted sum as a weighted average of the pixel information from the input image and the filtered transformation. The method 700 proceeds to step 712, at which the method 700 determines whether to examine a next pixel. If it is determined that there are no more pixels to be examined (option "NO"), the method 700 proceeds to step 714, at which, the method 700 ends. If it is determined that that the next pixel is to be examined (option "YES"), the method 700 returns to step 708.

Figure 8:
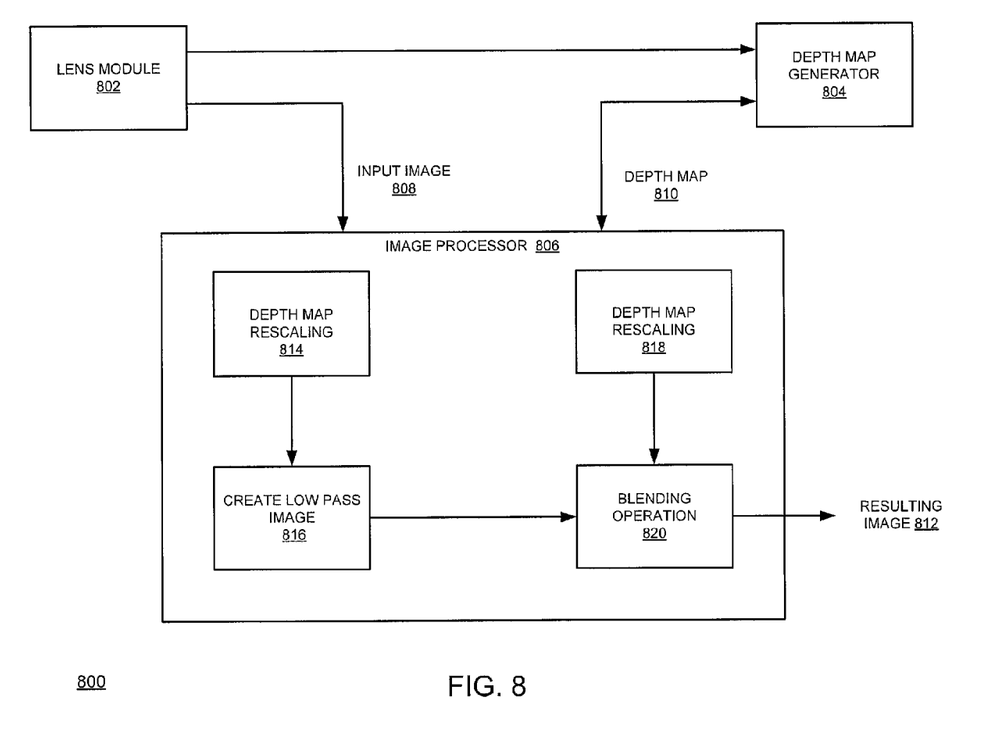

FIG. 8 illustrates a functional block diagram of a process 800 for performing a blur rendering process on an image, according to one or more embodiments. The process 800 utilizes a lens module 802, a depth map generator 804, and an image processor 806. The lens module 802 is operatively coupled with the depth map generator 804 and captures images or video frames. The lens module 802 captures an input (i.e. the image 110 of FIG. 1) and sends the image as the input image 808 to the image processor 806. In some embodiments, the lens module 802 captures a beam of light for a left eye and a right eye respectively and produces the input image 808.

In some embodiments, the depth map generator 804 accesses the input image 808 and applies depth estimation techniques. In some embodiments, the depth map generator 804 uses a kernel (i.e., a matrix) based method for each pixel to determine a relative distance. In some implementations, the relative distance may be referred to as an iteration number. The iteration number is a representation of depth for the pixel in the image. Hence, the iteration number may be used as a depth value for image processing. In other implementations the depth map generator 804 computes depth values using the standard techniques such as depth from shading, depth from stereo, depth from defocus etc. In some embodiments, the depth map generator refines the depth map information by repeating the standard techniques.

In some embodiments, the depth map generator 804 produces a dense depth map, which is utilized by the image processor 806 instead of coarse depth map to perform the blur rendering process. However, currently available techniques for depth map generation can only produce the coarse depth map having a reduced spatial resolution. In order to create the dense depth map, the depth map generator 804 executes a refinement process on the depth values. Exemplary embodiments of such a refinement process are provided in U.S. non-provisional patent application Ser. No. 12/931,293, entitled "Method and apparatus for generating a dense depth map using an adaptive joint bilateral filter" and filed on Jan. 28, 2011, which is herein incorporated by reference in its entirety.

The image processor 806 is a circuit that receives the depth map 810 (i.e. the depth map information 108 of FIG. 1) and the input image 808 and produces a resulting image 812 (i.e. the resulting image 120 of FIG. 1) as output. The image processor 806 performs a first operation 814 for scaling of the depth map 810 and creating an edge preserved, low pass image 816 (e.g., the filtered image 118). The first operation 814 is an optical operation which maps the iteration number to a blur radius, while the second operation 818 is a non-linear transformation (e.g., the non-linear transformation 124 of FIG. 1) of depth map 810 to create blending coefficients. A blending operation 820 is applied to the image from 816, original image 808, and a depth map provided by the second operation 818 to generate the resulting image 812.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via inter-computer communication. Some or all of the device components or data structures may also be stored (e.g., as instructions or structured data) on a computer-accessible medium or a portable article to be read by an appropriate drive, various examples of which are described above. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of performing a blur rendering process on an image, comprising:
    accessing a filtered image and depth map information;
    determining a plurality of blending coefficients for computing a weighted sum for the image and filtered image, wherein the plurality of blending coefficients define a non-linear transformation comprising a substantially smooth transition from at least one first depth class to at least one second depth class and a substantially sharp transition from the at least one second depth class and the at least one first depth class, wherein the at least one first depth class and the at least one second depth class form at least a portion of a plurality of depth classes; and
    combining the image and the filtered image into a resulting image using the weighted sum.

2. The method of claim 1, wherein accessing the filtered image comprises determining filtering parameters for defining the filter.

3. The method of claim 1, wherein accessing the filtered image and depth map information further comprises rescaling the depth map information, wherein the rescaled depth map information is used for blurring pixel information within at least one region of the image while preserving pixel information associated with boundaries of the at least one region.

4. The method of claim 1, wherein accessing the filtered image and depth map information further comprises determining a blur radius associated with filtering the image based on the depth map information.

5. The method of claim 1, wherein the at least one first depth class comprises a foreground and the at least one second depth class comprises a background.

6. The method of claim 5, wherein determining the plurality of blending coefficients further comprising:
    computing likelihood distributions for the background and the foreground; and
    applying a statistical technique to the likelihood distributions to determine posterior probabilities for belonging to the background.

7. The method of claim 6 further comprising fitting the posterior probabilities to a Gaussian distribution and modifying the posterior probabilities.

8. The method of claim 7 further comprising mapping the plurality of blending coefficients to depth values of the depth map information.

9. The method of claim 6, wherein combining the image and the filtered image comprises blending pixel information for a filtered background with pixel information for a focused foreground.

10. The method of claim 6, wherein combining the image with the filtered image further comprising:
    for each pixel associated with the image and the filtered image:
        applying an inverse of a corresponding blending coefficient to pixel information from the image wherein the inverse of the corresponding blending coefficient indicates a probability that the each pixel is associated with the foreground;
        applying the corresponding blending coefficient to pixel information associated with filtered image, wherein the corresponding blending coefficient indicates a probability that the each pixel is associated with the background; and
        storing a sum of the first applying step and the second applying step as pixel information for the resulting image.

11. An apparatus for performing a blur rendering process on an image, comprising:
    an image processor for accessing a filtered image and depth map information, determining a plurality of blending coefficients for computing a weighted sum on the image and filtered image, wherein the plurality of blending coefficients define a non-linear transformation comprising:
    a substantially smooth transition from at least one first depth class to at least one second depth class and a substantially sharp transition from the at least one second depth class and the at least one first depth class and combining the image and the filtered image into a resulting image using the plurality of blending coefficients, wherein the at least one first depth class and the at least one second depth class form at least a portion of a plurality of depth classes.

12. The apparatus of claim 11, wherein the image processor comprises a filter module for determining a blur radius based on the depth map information.

13. The apparatus of claim 12, wherein the filter module uses the blur radius to define at least one low pass parameter for filtering the image.

14. The apparatus of claim 11, wherein the image processor further comprises an image blending module for applying the non-linear transformation to the image and the filtered image.

15. A non-transitory computer readable storage medium comprising one or more processor executable instructions that, when executed by at least one processor, causes the at least one processor to perform a method comprising:
- accessing a filtered image and depth map information;
- determining a plurality of blending coefficients for computing a weighted sum on the image and filtered image, wherein the plurality of blending coefficients define a non-linear transformation comprising:
  - a substantially smooth transition from at least one first depth class to at least one second depth class and a substantially sharp transition from the at least one second depth class and the at least one first depth class, wherein the at least one first depth class and the at least one second depth class form at least a portion of a plurality of depth classes; and
- combining the image and the filtered image into a resulting image using the plurality of blending coefficients.

16. The computer-readable-storage medium of claim 15, wherein the one or more processor executable instructions perform the method further comprising:
- for each pixel associated with the image and the filtered image:
  - applying an inverse of a corresponding blending coefficient to pixel information from the image wherein the inverse of the corresponding blending coefficient indicates a probability that the each pixel is associated with the foreground;
  - applying the corresponding blending coefficient to pixel information associated with filtered image, wherein the corresponding blending coefficient indicates a probability that the each pixel is associated with the background; and
  - storing a sum of the first applying step and the second applying step as pixel information for the resulting image.

17. The computer-readable-storage medium of claim 16, wherein the one or more processor executable instructions perform the method further comprising:
- determining a blur radius based on the depth map information; and
- defining at least one low pass parameter for filtering the image using the blur radius.

18. The computer-readable-storage medium of claim 16, wherein the one or more processor executable instructions perform the method further comprising:
- computing likelihood distributions for the background and the foreground; and
- applying a maximum a posterior technique to the likelihood distributions to determine posterior probabilities for belonging to the background.

19. The computer-readable-storage medium of claim 16, wherein the one or more processor executable instructions perform the method further comprising:
- rescaling the depth map information, wherein the rescaled depth map information is used for smoothing pixel information within at least one region the examined image while preserving pixel information associated with areas between the at least one region.

20. The computer-readable-storage medium of claim 16, wherein the one or more processor executable instructions perform the method further comprising:
- computing likelihood distributions for the background and the foreground;
- applying a maximum a posterior technique to the likelihood distributions to determine posterior probabilities for belonging to the background;
- fitting the posterior probabilities to a Gaussian distribution; and
- mapping the plurality of blending coefficients to depth values of the depth map information.

* * * * *